T. DOWLING.
Hot Air Furnace.

No. 39,385.

3 Sheets—Sheet 1.

Patented Aug. 4, 1863.

WITNESSES:

INVENTOR:

T. DOWLING.
Hot Air Furnace.

No. 39,385.

3 Sheets—Sheet 2.

Patented Aug. 4, 1863.

WITNESSES:
R. H. Eddy
F. P. Hale Jr.

INVENTOR
Thomas Dowling

T. DOWLING.
Hot Air Furnace.

No. 39,385. Patented Aug. 4, 1863.

WITNESSES:

INVENTOR
Thomas Dowling

UNITED STATES PATENT OFFICE.

THOMAS DOWLING, OF LYNN, MASSACHUSETTS.

IMPROVEMENT IN HEATERS.

Specification forming part of Letters Patent No. 39,385, dated August 4, 1863.

*To all whom it may concern:*

Be it known that I, THOMAS DOWLING, a citizen of the United States of America, and a resident of Lynn, in the county of Essex and State of Massachusetts, have invented an Improved Portable Hot-Air Furnace; and I do hereby declare the same to be fully described in the following specification and represented in the accompanying drawings, of which—

Figure 1:
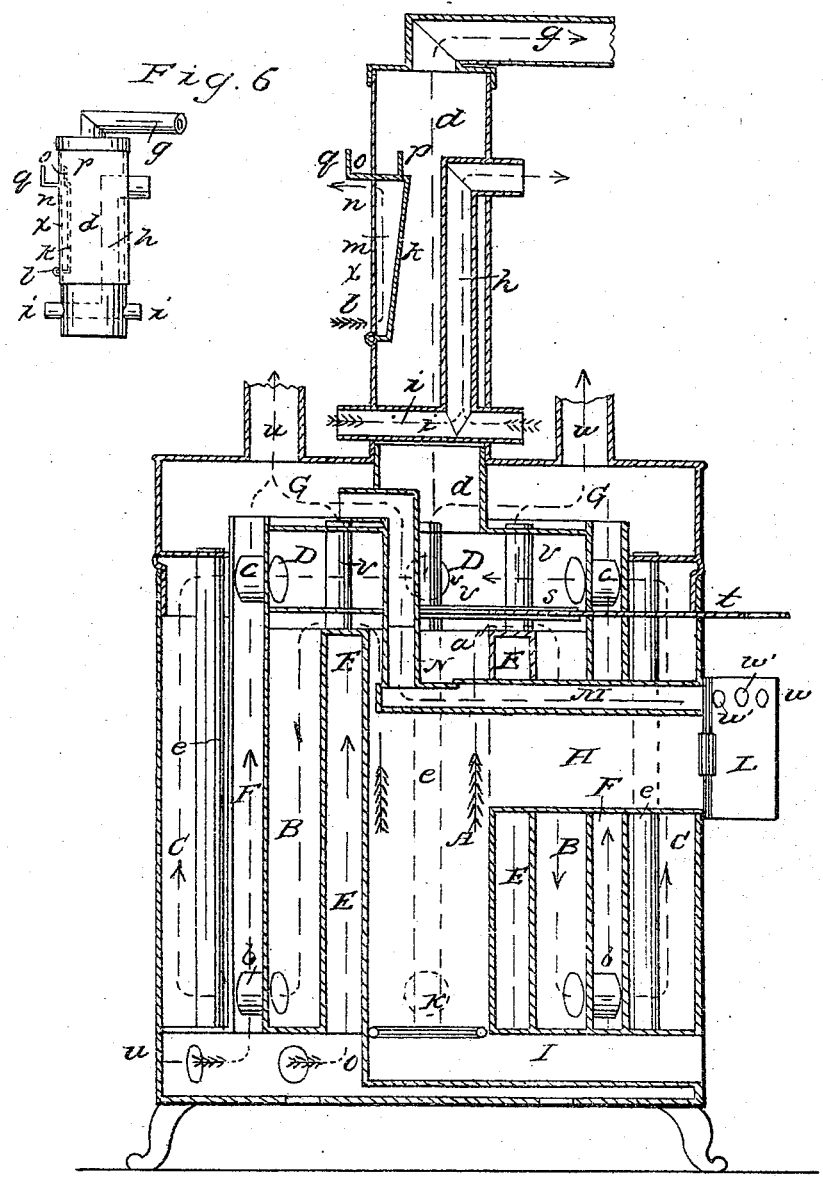
Figure 2:
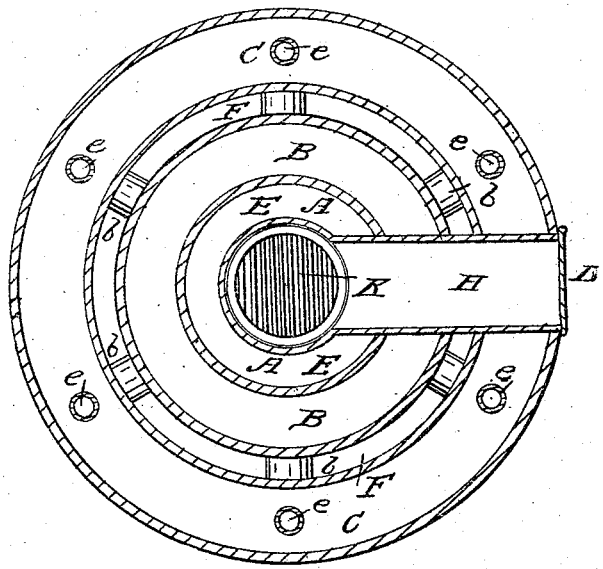
Figure 3:
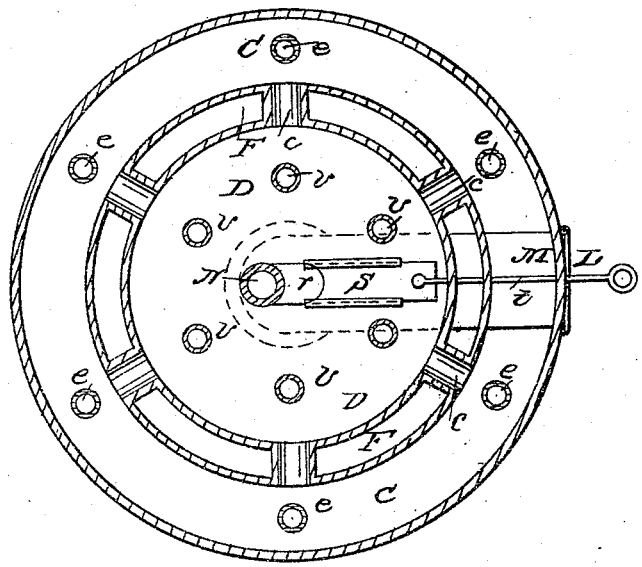
Figure 4:
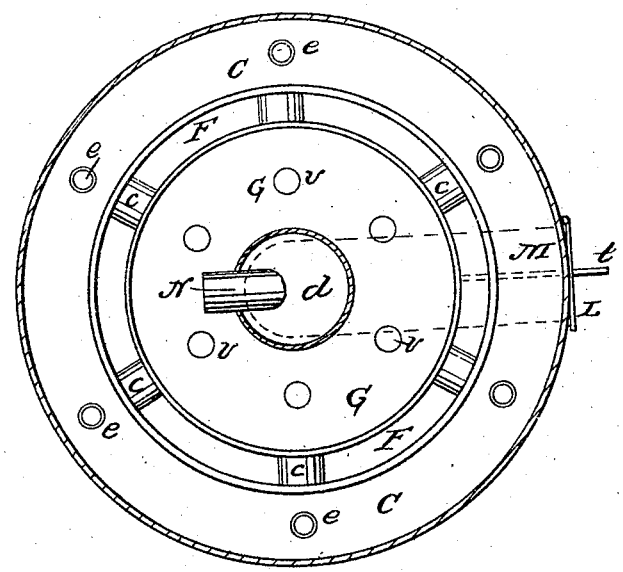
Figure 5:
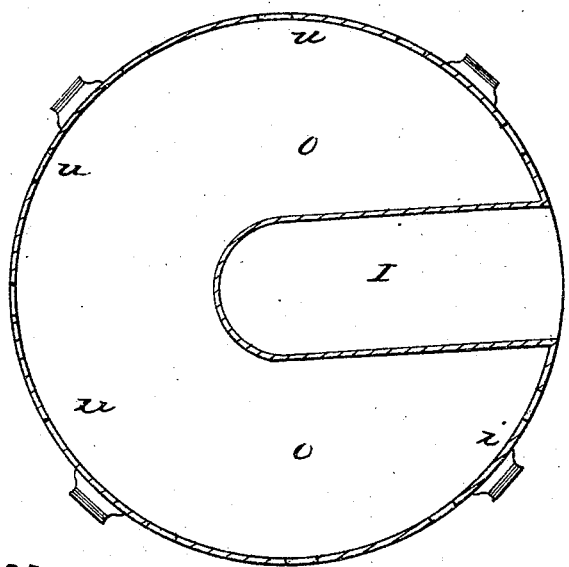

Figure 1 is a vertical section of the said hot-air furnace. Fig. 2 is a horizontal section taken through the throat of the fuel-chamber. Fig. 3 is a horizontal section taken through the horizontal smoke-chamber. Fig. 4 is a horizontal section taken through the upper horizontal air-chamber. Fig. 5 is a horizontal section taken through the ash-pit. Fig. 6 is a side view of the smoke-pipe, its damper, and air-openings.

In such drawings, A exhibits a fire pot or chamber provided with a grate, K, an ash-box or chamber, I, and a fuel-supplying throat, H. Concentrically about the said fire-chamber, which is cylindrical in form, there are two annular smoke drums or chambers, B and C, which are so arranged with respect to each other and the fire-chamber or pot A as to form concentric air-heating spaces or chambers E and F, one of which—viz., E—directly encircles the fire-pot, while the other—viz., F—is disposed between the smoke-drums B C, and separates one of them from the other. The fire-pot A at its upper part opens by one or more pipes, or by a conduit, $a$, directly into the smoke-space drum B, which, by sundry radial pipes, $b\ b$, communicates with the lower part of the smoke-drum C. This latter drum, C, opens at its upper part by a series of short pipes, $c\ c$, immediately into a horizontal and circular smoke-chamber D, arranged directly over the fire-pot, there being a direct draft passage or opening, $r$, in the top of the fire-pot and the bottom of the said chamber. This opening is to be provided with a sliding cover or damper, $s$, the rod $t$ of which extends entirely through the apparatus, as shown in Fig. 1. Over the chamber D there is a horizontal air-chamber, G, and surrounding the ash-pit chamber I there is an air-receiving chamber, O, whose sides are provided with air-inlets $u\ u$. The two air-chambers E and F open at their lower ends directly out of the receiving-chamber O. Each chamber E F at its upper part communicates with the air-chamber G, the chamber F opens directly into such chamber G, while the chamber E has a series of vertical pipes, $v\ v$, leading from it through the smoke-chamber D and into the air-chamber G. There is also another series of air-pipes, $e\ e$, arranged vertically within the annular smoke-drum C, and opening out of the chamber O and into the chamber G. Pipes for leading the heated air to different rooms or apartments are shown at $w\ w$ as opening out of the upper part of the air-chamber G. Furthermore, there is a rectangular or flat air-duct, M, leading over the throat H and into the fire-pot A, and being connected with the air-chamber G by means of a pipe, N. The chamber or duct M is opened at its front end, the door L of the fuel-throat H being made so as not only to extend above the mouth of the conduit M, but with one or more register-openings, $w'\ w'\ w'$, so arranged as to allow air to pass into the conduit M when the door L is closed. An eduction-pipe, $d$, leads upward through the chamber G and out of the smoke chamber D, and should extend up into a ch'm'ey by means of a conduit or smoke-pipe, $g$. That part of the pipe $d$ which is immediately above the air-chamber $g$, I usually form square in its horizontal section. A horizontal air-pipe, $i$, is carried through it, and has a vertical air-pipe, $h$, leading upward from it and out through one side of the case $d$, as shown in Fig. 1. Air on passing through the pipes $i$ and $h$ will be warmed by the hot smoke while coursing upward through the pipe $d$. A swing-damper, $k$, the upper part of which is bent horizontally and formed with two projections or gates, $p\ q$, as shown in Fig. 1, is arranged within the pipe or box $d$, and at its lower end is hinged to the side of such pipe. The horizontal bent part of the damper extends through an opening leading out of the side of the damper, as shown at $n\ o$ in Fig. 1. There is also another opening, $l$, made through the same side of the pipe $d$, and just above the hinge of the damper. By moving the damper $k$ inward or toward the axis of the pipe we shall not only decrease the smoke-passage of the pipe, but we shall diminish the passage of air through the inlet $o$. The damper, on being caused to depart from the side of the pipe $d$, aids in forming an air-heating chamber m, into which air will rush through the opening l and be discharged out of the opening n. When the damper is drawn back closely against the side x of the pipe d, not only will the chamber m be extinguished, but the opening o will be closed by the projecting plate p. By forcing the damper inward far enough the opening o will be closed by the part q. Such a construction and arrangement of the damper and its air-opening o is very useful in regulating the draft of the furnace or fire-place and as a means of economizing fuel.

The apparatus above described is to be composed, principally, of either sheet or cast iron or other suitable metal. In its operation the smoke and heated volatile products arising from the fuel when in the fire-pot A will flow into the annular drum B. Descending through this drum and heating its sides, the smoke and hot gases will pass out of it and by the pipes b b into the annular drum C. Coursing upward through the latter drum, they will impart heat to it and to its series of pipes e e, and will rush through the pipes c c and into the smoke-chamber D, from which they will escape by the eduction pipe d. The air received into the chamber O will pass upward through the concentric spaces E and F, and also through the pipes e e, and after being heated by the caloric radiated from the smoke flues and chambers will be received into the chamber G, from whence it may be distributed to various apartments by the pipes w w. The heat radiated from the outside surface of the external smoke drum, C, will serve to warm the apartment within which the heating apparatus or hot-air furnace may be situated. A hot-air furnace so constructed has been found to be highly effective in its operation and very beneficial and economical in its results in respect to fuel and heat.

I do not claim the combination of a damper, smoke-pipe, and air-inlet so that the movement of the damper by which the inlet of air may be diminished will cause an increase of opening of the smoke passage, and also so that a counter movement of the damper shall produce an increase of the inlet of air into and a diminution of the passage of smoke through the smoke-pipe; but

I claim—

1. The combination of the series of pipes e e, (arranged within the external smoke-chamber, as specified,) the fire-chamber A, the smoke-chambers B C D, the air-chambers G O, and the concentric air chambers or passages E and F, the whole being substantially as above described.

2. My improved air and smoke damper and its peculiar arrangement with respect to the pipe d and the air-inlet o thereof, the said damper being made with a flexure and with the two plates or covers p q and arranged within both pipe and inlet, as shown in Fig. 1, and as hereinbefore described.

3. The combination of the air-inlets n l with the air-space m and the damper k, made in manner and arranged within the pipe d substantially as specified.

THOMAS DOWLING.

Witnesses:
R. H. EDDY,
F. P. HALE, Jr.